Feb. 2, 1926. 1,571,480
J. JUHASZ
REVERSIBLE TURNDOWN COLLAR AND METHOD OF MAKING THE SAME
Filed March 28, 1925
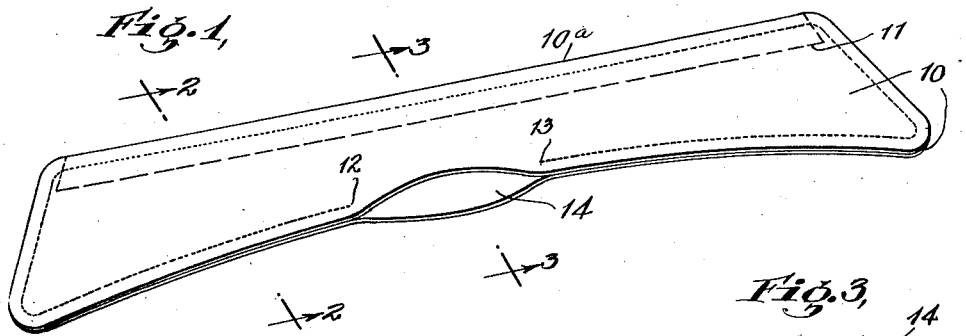
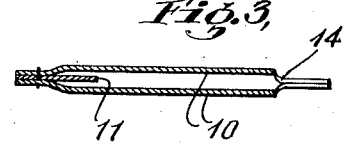
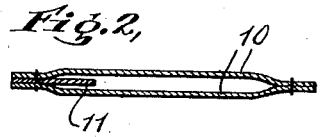
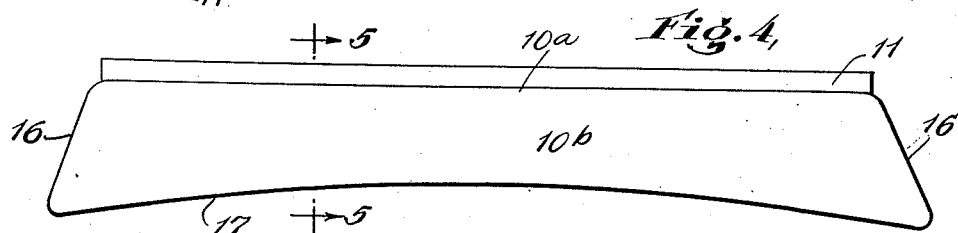
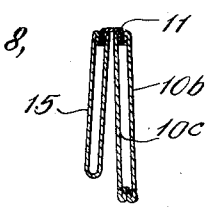
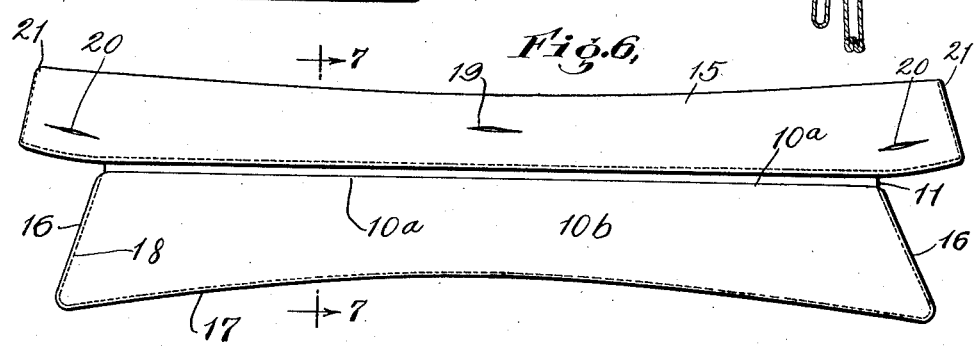
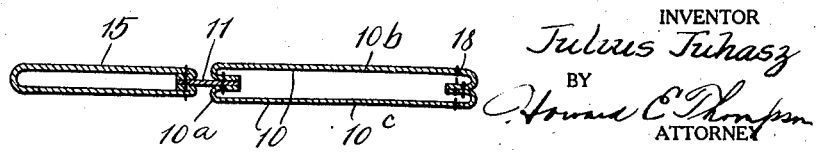
INVENTOR
Julius Juhasz
BY
ATTORNEY

Patented Feb. 2, 1926.

1,571,480

UNITED STATES PATENT OFFICE.

JULIUS JUHÁSZ, OF MADISON, CONNECTICUT.

REVERSIBLE TURNDOWN COLLAR AND METHOD OF MAKING THE SAME.

Application filed March 28, 1925. Serial No. 18,945.

*To all whom it may concern:*

Be it known that I, JULIUS JUHÁSZ, a citizen of the United States, and residing at Madison, in the county of New Haven and State of Connecticut, have invented certain new and useful Improvements in Reversible Turndown Collars and Methods of Making the Same, of which the following is a specification such as will enable those skilled in the art to which it appertains to make and use the same.

This invention relates to turn down collars and particularly to reversible collars of this class of the soft, semi-soft or stiff type; and the object of the invention is to provide a collar of the class specified which is so constructed as to permit of the double use of the collar or the use of both side faces of the turn down portion thereof without laundering the collar between such double uses; a further object being to provide a collar of the class specified, the upper edge of the turn down portion of which is so formed as to be without exposed stitches in order to represent a collar of the present construction when used on either side face or in the double use thereof; a still further object being to provide a collar comprising a neck band portion and a turn down portion separately formed and joined together by a coupling member or part; and with these and other objects in view, the invention consists in a collar of the class and for the purpose specified constructed as herein shown and described and in accordance with the method hereinafter set out.

The invention is fully disclosed in the following specification, of which the accompanying drawing forms a part, in which the separate parts of my improvement are designated by suitable reference characters in each of the views, and in which:—

Fig. 1 is a perspective view of one part of my improved collar illustrating a method of partially forming the same.

Fig. 2 is a section on the line 2—2 of Fig. 1.

Fig. 3 is a section on the line 3—3 of Fig. 1.

Fig. 4 is a plan view of the collar part shown in Figs. 1 to 3 inclusive, turned inside out.

Fig. 5 is a section on the line 5—5 of Fig. 4.

Fig. 6 is a view showing the collar part illustrated in Figs. 1 to 5 inclusive completely formed with the neck band portion or part coupled therewith.

Fig. 7 is a section on the line 7—7 of Fig. 6; and,

Fig. 8 is a transverse sectional view through the neck band and turn down portions of the collar.

In the formation of my improved collar, I first cut from a suitable fabric, two turn down collar parts 10 which will be of the desired contour for the particular shape of collar desired, and both of which parts will be of the same shape and dimensions, and these parts are placed one upon another with a binding or coupling strip 11 between the adjacent faces thereof and extending longitudinally of the straight side edge 10ª of the parts 10. After the parts have been assembled in the manner described, the parts 10 and 11 are stitched together by a line of stitching, starting at one of the points for example the point 12 and extending around the peripheral portion of the parts 10 to the other point 13, which operation secures the strip 11 to the parts 10, and leaves between the points 12—13, an opening 14 to permit of the turning of the parts 10 inside out. It will be noted that the strip 11 extends into the space between the parts 11, a predetermined distance so that when said parts are turned inside out as seen in Fig. 4 of the drawing, the strip 11 will project beyond the straight edge of said parts 10 to permit of the attachment of the neck band portion 15 thereto as seen in Fig. 6 of the drawing.

After the turn down portion of the collar has been turned inside out to produce the smooth and finished edges about the periphery thereof and without exposed stitchings as seen in Fig. 4 of the drawing, the side edges 16 of the wings of the turn down portion as well as the curved edge 17 of the collar are stitched by a line of stitching 18 to represent the general appearance of the turn down portion of a collar and also to close the opening 14, it being understood that in Fig. 1 of the drawing, the parts 10 have been stretched laterally to clearly represent the pocket or opening, but in reversing or turning the turn down portion inside out, a finished edge 17 will be produced.

As seen in Fig. 6 of the drawing, the result of the stitchings 18 will leave at the upper or straight edge 10ᵃ of the turn down portion of the collar, an unstitched, smooth and rounded edge such as commonly employed in collars as now constructed. The neck band portion 15 is so stitched to the strip or coupling member 11 as to hold the upper edge portion of the neck band 15 and the upper edge portion of the turn down part of the collar in juxtaposition when the collar is in use, thereby presenting a neat and finished appearance and representing from all outward appearances, the usual collar construction regardless of which of the side faces 10ᵇ or 10ᶜ of the turn down portion of the collar is exposed outwardly in the reverse use of the collar.

The neck band portion 15 is provided with the usual center button-hole 19 and front or flap button-holes 20, the flaps 21 being preferably of the same general shape and form to compensate for the reverse use of the collar, but it will be understood that this specific limitation is not necessary.

Another distinctive feature of the invention resides in the provision of a strip or coupling member 11 which is composed of such material as to render the same flexible at all times in a starched or otherwise stiffened collar construction, which result may be accomplished by waterproofing the strip 11 or in any other desired manner, thus rendering said strip resilient or flexible and permitting of the free reversal of the turn down portion of the collar without injury to the strip in cracking or breaking the same such as would occur if such strip 11 were starched or stiffened. However, by reason of the weakness of the strip as compared with the turn down portion and neck band portion of the collar, the same would be rendered flexible and readily foldable, even if the same were starched. It will be apparent that in soft collars or even semi-soft collars, the provision of a special or waterproofed strip is not essential.

From the foregoing, it will be apparent that a turn down collar of any shape, form and construction may be made in accordance with the method herein set out, and when so made will represent the present turn down collar construction, it being further apparent that my invention may be employed in connection with the making of soft, semi-soft or starched turn down collars, said collars being constructed along the present and well-known methods in forming different types of collars. A collar made in the manner herein set out, in addition to providing the extended or double use after each laundering, will also render greater and longer service in extending the time or period of laundering to the degree controlled by its extended use, it being also apparent that the collar may be produced at a cost substantially equal to that of the production cost of collars as now constructed; and while I have shown and described one method of carrying my invention into effect and a collar of specific form and construction, I am not necessarily limited in these respects and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A collar of the class described comprising a turn down part and a neck band part, a strip for coupling said parts together in spaced relation, said strip being treated to prevent the starching thereof.

2. The herein described method of forming a turn down collar which consists in providing two turn down collar parts of similar form, placing said parts one upon the other with a strip between and longitudinally of one edge of said parts, stitching said parts together throughout the periphery thereof except for a portion at the other edge thereof to form an opening between said parts, turning said collar part inside out through said opening to expose said strip, and then stitching the lower edge portion thereof to close the opening between the separate parts and to leave the upper edge of both side faces of said turn down portion without exposed stitchings.

3. The herein described method of forming a turn down collar which consists in providing two turn down collar parts of similar form, placing said parts one upon the other with a strip between and longitudinally of one edge of said parts, stitching said parts together throughout the periphery thereof except for a portion at the other edge thereof to form an opening between said parts, turning said collar part inside out through said opening to expose said strip, then stitching the lower edge portion thereof to close the opening between the separate parts and to leave the upper edge of both side faces of said turn down portion without exposed stitchings, and attaching the neck band portion to the projecting part of said strip.

4. The herein described method of making a reversible turn down collar which consists in stitching turn down collar forming faces together about the major portion of the periphery thereof and with a coupling strip attached to one edge thereof, the unstitched portion forming an opening, turning the product thus formed inside out through said opening and to project said strip beyond one side edge of said collar part, stitching said collar part to close the opening therein and to form at the edge thereof having the projecting strip, a plain and unobstructed surface, and then stitching a neck band portion to said projecting strip.

5. A reversible collar comprising a turn down part and a neck band part, said parts being coupled together by an independently formed weakened portion permitting the neck band part to be folded onto either side face of the turn down part in the dual use of the collar, and said independently formed portion being stitched to the turn down part in such manner that the upper edges of said turn down part in both uses will be without visible stitching.

6. A turn down collar comprising a turn down part and a neck band part, both of said parts being composed of starchable material, and a strip for coupling said parts together in spaced relation, said strip being treated to prevent the starching thereof and to render the same soft and flexible, and said strip being stitched to the upper edge of the turn down part in such manner as to conceal the stitches to provide plain and unobstructed outer faces on the turn down part adjacent said other edge.

7. A turn down collar comprising a turn down part and a neck band part, both of said parts being composed of starchable material, a strip for coupling said parts together in spaced relation, said strip being treated to prevent the starching thereof and to render the same soft and flexible, said strip being stitched to the upper edge of the turn down part in such manner as to conceal the stitches to provide plain and unobstructed outer faces on the turn down part adjacent said other edge, and said turn down part being reversible on the neck band part to provide a double use of said collar.

8. A reversible collar comprising a turn down part and a neck band part, the turn down part of the collar being formed of two or more plies, a strip positioned between the plies of the turn down part of the collar and stitched thereto and projecting beyond the upper edge of the turn down part, and the stitching securing said strip to the turn down part being concealed by the inner and outer faces of the turn down part of the collar.

9. A reversible collar comprising a turn down part and a neck band part, the turn down part of the collar being formed of two or more plies, a strip positioned between the plies of the turn down part of the collar and stitched thereto and projecting beyond the upper edge of the turn down part, the stitching securing said strip to the turn down part being concealed by the inner and outer faces of the turn down part of the collar, and said strip being treated to render the same flexible and waterproof.

In testimony that I claim the foregoing as my invention I have signed my name this twenty-fifth day of March, 1925.

JULIUS JUHÁSZ.